United States Patent
Otsuka et al.

(10) Patent No.: US 8,232,329 B2
(45) Date of Patent: Jul. 31, 2012

(54) INKJET INK

(75) Inventors: Hidenori Otsuka, Kanagawa-ken (JP); Masayuki Fukaishi, Chiba-ken (JP); Takashi Ishizuka, Chiba-ken (JP); Koji Ueno, Ibaraki-ken (JP); Yoshihiro Saito, Tokyo-to (JP); Teruaki Okawa, Ibaraki-ken (JP); Naofumi Ezaki, Ibaraki-ken (JP)

(73) Assignees: Tokyo University of Science Educational Foundation Administrative Organization, Tokyo (JP); Riso Kagaku Corporation, Tokyo (JP)

( * ) Notice: Subject to any disclaimer, the term of this patent is extended or adjusted under 35 U.S.C. 154(b) by 294 days.

(21) Appl. No.: 12/461,900

(22) Filed: Aug. 27, 2009

(65) Prior Publication Data

US 2010/0159212 A1 Jun. 24, 2010

(30) Foreign Application Priority Data

Dec. 24, 2008 (JP) .................. P2008-327339

(51) Int. Cl.
C09D 11/10 (2006.01)
(52) U.S. Cl. ............... 523/160; 524/548; 428/195.1
(58) Field of Classification Search .............. 524/548; 523/160; 428/195.1
See application file for complete search history.

(56) References Cited

FOREIGN PATENT DOCUMENTS
JP 2007-153975 A 6/2007

OTHER PUBLICATIONS

Fukaishi, M., et al., "Dispersion and Absorption on Nanoparticles of Poly(vinylpyridine)-graft-Poly(ethylene glycol)," Annual Technical Meeting of Japan Society of Colour Material, (2008), (English Translation) pp. 1-4 pp. 124-125.

*Primary Examiner* — David W Wu
*Assistant Examiner* — Vu A Nguyen
(74) *Attorney, Agent, or Firm* — The Nath Law Group; Joshua B. Goldberg; Megan B. Doughty

(57) ABSTRACT

An inkjet ink that prevents paper deformation such as curling, and also exhibits favorable pigment dispersibility. The inkjet ink includes at least a pigment, water, a water-soluble organic solvent having an α value of not more than 65, and a dispersant, wherein the dispersant is a copolymer having a unit A represented by general formula (a) shown below and a unit B represented by general formula (b) shown below, and the mass ratio between the water-soluble organic solvent and the water satisfies (water-soluble organic solvent)/water=5/5 to 8/2.

[Formula 1]

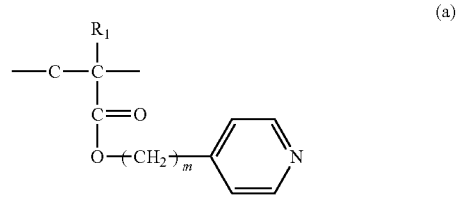

(a)

[In general formula (a), $R_1$ represents a hydrogen atom or a lower alkyl group, and m represents an integer of 1 to 3.]

[Formula 2]

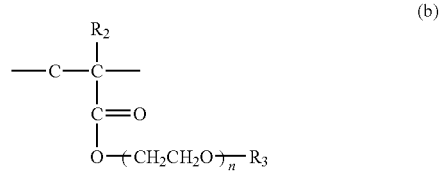

(b)

[In general formula (b), $R_2$ and $R_3$ each represents a hydrogen atom or a lower alkyl group, wherein $R_2$ and $R_3$ may be the same or different, and n represents an integer of 1 to 250.]

3 Claims, No Drawings

INKJET INK

CROSS REFERENCE TO RELATED APPLICATIONS

This application is based upon and claims the benefit of priority from prior Japanese Patent Application No. 2008-327339 field on Dec. 24, 2008; the entire contents of which are incorporated by reference herein.

TECHNICAL FIELD

The present invention relates to an inkjet ink.

BACKGROUND ART

In inkjet printing, printing is conducted by spraying a liquid ink with a high degree of fluidity from very fine nozzles, and adhering that ink to a recording medium such as a sheet of paper. This type of inkjet printing enables the printing of high-resolution, high-quality images at high speed and with minimal noise, using a comparatively inexpensive printing apparatus, and is rapidly becoming widespread. Inkjet printing is conducted mainly using thermal systems that use heat to spray the ink, piezo systems that use application of a vibration to spray the ink, and electrostatic systems.

In terms of the inks for these inkjet systems, aqueous type inks are becoming more prevalent, as they are capable of producing high-quality printed items at low cost. Aqueous inks are inks in which water is included to enhance the drying properties, and compared with oil-based inks, offer the advantages of resistance to show-through (penetration of the ink through to the underside of the recording medium) even if double-sided printing is conducted onto plain paper, and favorable text reproducibility. The colorants used for these aqueous inks can be broadly classified into dyes and pigments, and pigment inks are rapidly gaining in popularity, as they offer superior levels of light resistance and water resistance.

Examples of problems that may occur when printing an aqueous ink onto paper such as plain paper include the phenomena of curling (convex curling) and cockling (wrinkling). These phenomena occur because the moisture within the aqueous ink causes cleavage of the hydrogen bonds between fibers within the paper, causing the paper to swell.

In order to address this type of curling problem, Patent Document 1 proposes an aqueous inkjet ink comprising water, a water-soluble organic solvent and a pigment, wherein the amount of the portion of the water-soluble organic solvent that has an SP value of at least 16.5 but less than 24.6 represents at least 30% by mass of the entire ink. A water-soluble organic solvent having an SP value within this range exhibits favorable compatibility with water, and also exhibits a curling inhibiting effect. By including at least 30% by mass of this type of water-soluble organic solvent, curling and cockling can be prevented.

[Patent Document 1] Japanese Patent Laid-Open No. 2007-153975

DISCLOSURE OF INVENTION

Problems to be Solved by the Invention

Aqueous inkjet inks have conventionally suffered from paper deformation problems such as curling and cockling. In Patent Document 1, because a mixed solvent medium of water and a low polarity water-soluble organic solvent is used, the pigment dispersibility tends to be inferior. It is surmised that the reason for this inferior dispersibility is because in an aqueous solvent medium, the bonding between the pigment and the dispersant is based on adsorption due to a so-called hydrophobic interaction, whereas in a mixed solvent medium of water and a low polarity water-soluble organic solvent, this interaction tends to weaken.

Accordingly, an object of the present invention is to provide an inkjet ink that prevents paper deformation such as curling, and also exhibits favorable pigment dispersibility.

Means to Solve the Problems

A first aspect of the present invention is an inkjet ink comprising at least a pigment, water, a water-soluble organic solvent having an α value of not more than 65, and a dispersant, wherein the dispersant is a copolymer having a unit A represented by general formula (a) shown below and a unit B represented by general formula (b) shown below, and a mass ratio between the water-soluble organic solvent and the water satisfies (water-soluble organic solvent)/water=5/5 to 8/2.

[Formula 1]

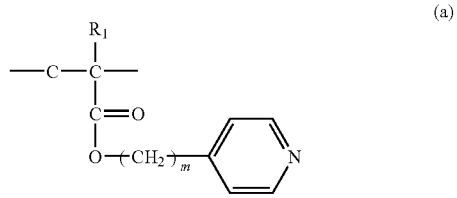

[In general formula (a), $R_1$ represents a hydrogen atom or a lower alkyl group, and m represents an integer of 1 to 3.]

[Formula 2]

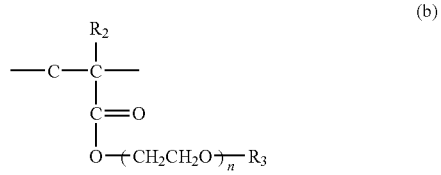

[In general formula (b), $R_2$ and $R_3$ each represents a hydrogen atom or a lower alkyl group, wherein $R_2$ and $R_3$ may be the same or different, and n represents an integer of 1 to 250].

Another aspect of the present invention is a printed item printed using the above inkjet ink.

EFFECT OF THE INVENTION

The present invention is able to provide an inkjet ink that prevents paper deformation such as curling, and also exhibits favorable pigment dispersibility.

BEST MODE FOR CARRYING OUT THE INVENTION

Embodiments according to the present invention are described below, but the examples in the following embodiments in no way limit the present invention.

An inkjet ink of the present invention comprises at least a pigment, water, a water-soluble organic solvent having an α value of not more than 65, and a dispersant, wherein the dispersant is a copolymer (hereafter also referred to as "copolymer (I)") having a unit A represented by general formula (a) and a unit B represented by general formula (b), and a mass ratio between the water-soluble organic solvent and the water satisfies (water-soluble organic solvent)/water=5/5 to 8/2.

In the present invention, including at least a pigment, water, a water-soluble organic solvent having an α value of not more than 65, and a copolymer (I) as a dispersant means that when the pigment is dispersed within the water and low polarity water-soluble organic solvent, the pigment is protected by the copolymer (I), thereby improving the dispersibility. In comparison, if the pigment is dispersed in a system containing the same water and low polarity water-soluble organic solvent but excluding the copolymer (I), then the pigment dispersibility is unsatisfactory.

Furthermore, because the mass ratio between the water-soluble organic solvent and the water satisfies (water-soluble organic solvent)/water=5/5 to 8/2, even though a mixture of water and a comparatively low polarity water-soluble organic solvent is used to inhibit paper deformation such as curling, the dispersibility of the pigment provided by the copolymer (I) can be favorably maintained.

The dispersant of the present invention is a copolymer (I) having a unit A represented by general formula (a) and a unit B represented by general formula (b). The unit A has a pyridine (Py) portion, while the unit B has a polyethylene glycol (PEG) portion.

In general formula (a), as mentioned above, $R_1$ represents a hydrogen atom or a lower alkyl group (preferably C1), and m represents an integer of 1 to 3 and is preferably 3 as this yields the more stable dispersibility.

In general formula (b), as mentioned above, $R_2$ and $R_3$ each represents a hydrogen atom or a lower alkyl group (preferably C1), wherein $R_2$ and $R_3$ may be the same or different, and n represents an integer of 1 to 250.

In the copolymer (I), the ratio between the unit A and the unit B, namely the ratio unit B/unit A reported as a mass ratio between the constituent monomers, is preferably within a range from 20% to 30%, as such a ratio stabilizes the dispersibility.

In the copolymer (I), other copolymerizable monomers may be used as copolymer components, provided the functionality of the resulting copolymer as a dispersant is not impaired. Examples of these other monomers include (meth) acrylic-based monomers and styrene-based monomers.

The form of the copolymer of the unit A and the unit B is preferably a block copolymer, although other copolymer forms such as a random copolymer, alternating copolymer or graft copolymer may also be used, and there are no particular limitations provided the functionality of the resulting copolymer as a dispersant is not impaired.

The number average molecular weight of the copolymer (I) is preferably within a range from 10,000 to 200,000, and is more preferably from 30,000 to 60,000.

The amount of the copolymer (I), relative to the mass of the pigment, is preferably within a range from 5 to 200% by mass, and is more preferably from 10 to 100% by mass. An amount of the copolymer (I) that exceeds 200% by mass of the pigment mass tends to cause an increase in the ink viscosity and discharge faults, whereas if the amount is less than 5% by mass, the pigment cannot be favorably dispersed.

There are no particular restrictions on the method used for preparing the copolymer (I) provided the functionality of the copolymer (I) as a dispersant is not impaired. A specific example of a method of preparing the copolymer is described below.

The copolymer (I) can be obtained by graft copolymerization of a substrate having a unit A structure that contains a Py portion and a substrate having a unit B structure that contains a PEG portion. In a particularly preferred method, the copolymer (I) is prepared by a radical copolymerization in accordance with the formula shown below.

[Formula 3]

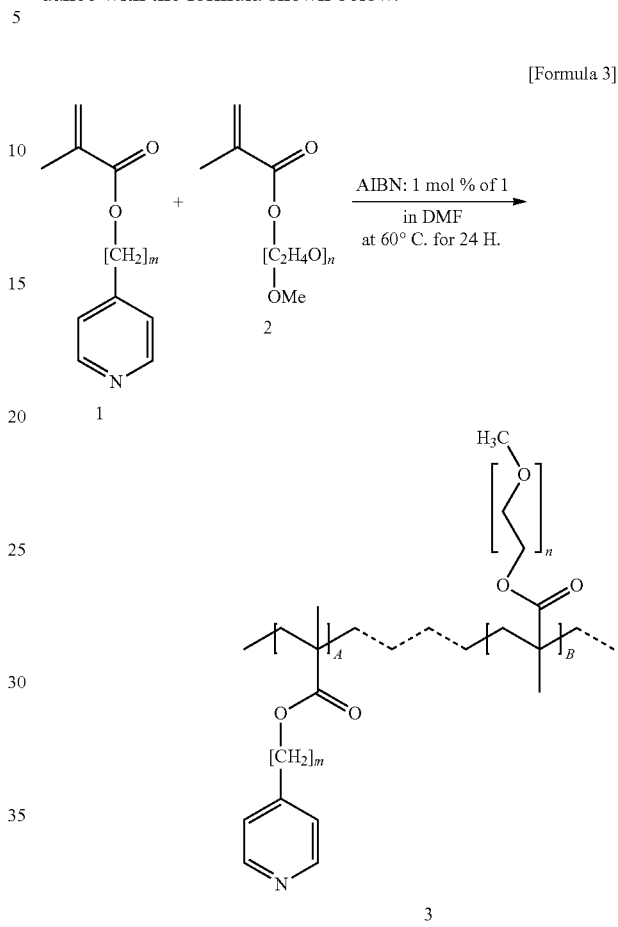

In the formula, (1) represents 4-pyridylmethyl methacrylate, (2) represents α-methyl-ω-methacryloyl-PEG, and (3) represents a copolymer having a unit A that contains a Py portion and a unit B that contains a PEG portion (hereafter also abbreviated as Py-g-PEG). In the Py-g-PEG represented by (3), (A) represents the unit A, in which $R_1$ in the above general formula (a) is a methyl group, and (B) represents the unit B, in which $R_2$ and $R_3$ in the above general formula (b) are both methyl groups.

In one example of the preparation method, 4-pyridylmethyl methacrylate (1), α-methyl-ω-methacryloyl-PEG (number average molecular weight (Mn)=2,080) (2), and an amount of AIBN (azobisisobutyronitrile) equivalent to 1 mol % of (1) are dissolved in an amount of DMF (dimethylformamide) equal to 10 times the mass of the monomers. The mixture is subjected to three repetitions of freezing and degassing, and the solution is then stirred for 24 hours at 60° C. The reaction mixture is then added dropwise to 2-propanol, and the resulting mixture is stirred for several minutes. The generated precipitate is isolated by centrifugal separation and then separated from benzene by freeze drying, yielding a white powder of Py-g-PEG (3).

If this type of Py-g-PEG is used as the dispersant, then it is thought that because the dispersant has a Py-g-PEG graft copolymer structure that includes a PEG portion and a Py portion within a single molecule, there are multiple points for interaction between the adsorption groups of the dispersant and the pigment, meaning the dispersant and the pigment adsorb strongly, resulting in superior dispersibility of the pigment within the ink.

The water-soluble organic solvent of the present invention is a solvent having an a value of not more than 65, and is preferably a solvent having an α value of not more than 55. The α value represents the polarity of the solvent from the viewpoint of solubility. A water-soluble organic solvent having an α value of not more than 65 is a comparatively low polarity solvent. Water has a high polarity, and therefore tends to readily cause paper deformation such as curling, but by combining the water with a low polarity water-soluble organic solvent, the overall polarity of the solvent medium can be reduced, enabling the prevention of paper deformation such as curling.

The α value is a value determined from tan α(=inorganic value/organic value). Here, the "inorganic value" and the "organic value" are properties used in an "organic conceptual diagram" proposed by Atsushi Fujita, in which an organic compound is described in terms of two factors, namely an "organicity" (covalent bonding character) derived from the covalently bonded chain within the carbon region of the compound, and an "inorganicity" (ionic bonding character) derived from the effect of the electrostatic properties that exist within the substituents (functional groups), and each of these factors is numericalized. In other words, the "inorganic value" and the "organic value" are determined from the structure of the organic compound, and the α value, which represents the ratio between the two factors, indicates the quantitative balance between the "organicity" and the "inorganicity" of the compound. Details regarding the "organic conceptual diagram" are described in "Systematic Organic Qualitative Analysis (Mixtures)", Atsushi Fujita et al., Kazama Shobo Co., Ltd. (1974).

Examples of this type of water-soluble organic solvent include polyethylene glycol monoalkyl ethers (such as tetraethylene glycol monobutyl ether, tetraethylene glycol monopentyl ether, tetraethylene glycol monohexyl ether, pentaethylene glycol monobutyl ether, pentaethylene glycol monopentyl ether, pentaethylene glycol monohexyl ether, hexaethylene glycol monobutyl ether, hexaethylene glycol monopentyl ether, and hexaethylene glycol monohexyl ether);

ethylene glycol monoalkyl ethers (such as ethylene glycol monomethyl ether, ethylene glycol monoethyl ether, and ethylene glycol monobutyl ether);

diethylene glycol monoalkyl ethers (such as diethylene glycol monomethyl ether, diethylene glycol monoethyl ether, and diethylene glycol monobutyl ether);

triethylene glycol monoalkyl ethers (such as triethylene glycol monomethyl ether, triethylene glycol monoethyl ether, and triethylene glycol monobutyl ether);

propylene glycol monoalkyl ethers (such as propylene glycol monomethyl ether, propylene glycol monoethyl ether, and propylene glycol monobutyl ether);

dipropylene glycol monoalkyl ethers (such as dipropylene glycol monomethyl ether, dipropylene glycol monoethyl ether, and dipropylene glycol monobutyl ether); and tripropylene glycol monoalkyl ethers (such as tripropylene glycol monomethyl ether, tripropylene glycol monoethyl ether, and tripropylene glycol monobutyl ether).

Two or more of these solvents may also be used in combination. Of the above solvents, the use of at least one of tetraethylene glycol monobutyl ether and triethylene glycol monobutyl ether is preferred.

Although there are no particular restrictions on the water used in the present invention, a water that contains minimal impurities, such as a purified water such as ion-exchanged water or distilled water, or an ultrapure water is preferred.

The mass ratio between the water-soluble organic solvent and the water in the present invention preferably satisfies (water-soluble organic solvent)/water=5/5 to 8/2.

By using the proportion of the water-soluble organic solvent as a reference, and ensuring that the mass ratio of (water-soluble organic solvent)/water is at least 5/5, the amount of highly polar water can be suppressed while the amount of the water-soluble organic solvent is increased, meaning paper deformation such as curling can be satisfactorily prevented. It is thought that if the proportion of water in the mass ratio of (water-soluble organic solvent)/water exceeds 5/5, then the solubility of the copolymer (I) in the solvent medium increases and the amount of adsorption to the pigment decreases, resulting in a deterioration in the dispersibility. For this reason also, the mass ratio of (water-soluble organic solvent)/water is preferably at least 5/5.

Further, by ensuring that the mass ratio of (water-soluble organic solvent)/water is not more than 8/2, the dispersibility of the pigment can be favorably maintained. The copolymer (I) tends to develop increased mobility as a result of being hydrated within the water solvent, thus ensuring favorable dispersibility. Accordingly, if the solvent medium contains no water and is composed solely of the water-soluble organic solvent, then it is thought that diffusion of the copolymer (I) within the solvent medium is poor, and even if the copolymer (I) adsorbs to the pigment, the resulting contribution to dispersion of the pigment is minimal, meaning the dispersibility tends to be poor. As a result, the mass ratio of (water-soluble organic solvent)/water is preferably not more than 8/2.

Examples of the pigment of the present invention include organic pigments such as azo-based pigments, phthalocyanine-based pigments, dye-based pigments, condensed polycyclic pigments, nitro-based pigments, and nitroso-based pigments (such as brilliant carmine 6B, lake red C, Watchung red, disazo yellow, Hansa yellow, phthalocyanine blue, phthalocyanine green, alkali blue and aniline black); inorganic pigments, including metals such as cobalt, iron, chromium, copper, zinc, lead, titanium, vanadium, manganese and nickel, as well as metal oxides and sulfides, and yellow ocher, ultramarine and iron blue pigments; and carbon blacks such as furnace carbon black, lamp black, acetylene black, and channel black. Any one of these pigments may be used alone, or two or more different pigments may be used in combination.

The amount (the solid fraction) of the pigment of the present invention, relative to the total mass of the ink, is preferably within a range from 0.1 to 25% by mass, is more preferably from 1 to 20% by mass, and is still more preferably from 2 to 15% by mass. By including an amount of pigment that satisfies this range, the coloration and color development of the colorant can be favorably maintained, an appropriate image density can be achieved, aggregation of the pigment particles can be suppressed, and the viscosity of the ink can be regulated at an appropriate level, meaning the ink can be reliably stored.

The ideal range for the viscosity of the inkjet ink of the present invention varies depending on factors such as the diameter of the nozzles within the inkjet head and the discharge environment, but at 23° C., is preferably within a range from 1 to 30 mpa·s, is more preferably from 5 to 15 mPa·s, and is further more preferably approximately 10 mpa·s. Here, the term "viscosity" describes a value measured at 23° C. by raising the shear stress from 0 Pa at a rate of 0.1 Pa/s, and refers to the measured value at 10 Pa.

If required, any of the various additives typically used within the field may be added to the inkjet ink of the present invention, provided the inclusion of these additives does not impair the object of the present invention.

Specifically, a surfactant may be added to the ink of the present invention as an antifoaming agent or surface tension reducing agent or the like. Examples of the surfactant include anionic surfactants such as fatty acid salts, esters of higher alcohols, alkylbenzenesulfonates, sulfosuccinates and higher alcohol phosphates, cationic surfactants such as aliphatic amine salts and quaternary ammonium salts, amphoteric surfactants such as amino acid-based and betaine-based surfactants, nonionic surfactants such as ethylene oxide adducts of higher alcohols, ethylene oxide adducts of alkylphenols, ethylene oxide adducts of polyhydric alcohol fatty acid esters, and acetylene glycols and ethylene oxide adducts thereof, as well as polymer-based, silicone-based or fluorine-based surfactants. Two or more of these surfactants may also be used in combination. These surfactants are preferably added in such amounts that they do not impair the functionality of the copolymer (I) as a dispersant.

An electrolyte may also be added to the ink of the present invention to regulate the viscosity. Examples of the electrolyte include sodium sulfate, potassium hydrogen phosphate, sodium citrate, potassium tartrate and sodium borate, and two or more of these electrolytes may also be used in combination.

A pH regulator may also be added to the ink of the present invention to regulate the pH. Examples of compounds that may be added as the pH regulator include sulfuric acid, nitric acid, acetic acid, sodium hydroxide, potassium hydroxide, ammonium hydroxide and triethanolamine. Two or more of these compounds may also be used in combination. Further, these compounds may also be used as ink thickeners.

Furthermore, an antioxidant may also be added to the ink of the present invention to prevent oxidation of the ink components and improve the ink storage stability. Examples of antioxidants that may be added include L-ascorbic acid, sodium L-ascorbate, sodium isoascorbate, potassium sulfite, sodium sulfite, sodium thiosulfate, sodium dithionite and sodium pyrosulfite, and two or more of these antioxidants may also be used in combination.

A preservative may also be added to the ink of the present invention to prevent decomposition and improve the ink storage stability. Examples of the preservative include isothiazolone-based preservatives such as 5-chloro-2-methyl-4-isothiazolin-3-one, 2-methyl-4-isothiazolin-3-one, 2-n-octyl-4-isothiazolin-3-one and 1,2-benzisothiazolin-3-one; triazine-based preservatives such as hexahydro-1,3,5-tris(2-hydroxyethyl)-s-triazine; pyridine-based and quinoline-based preservatives such as sodium 2-pyridinethiol 1-oxide and 8-oxyquinoline; dithiocarbamate-based preservatives such as sodium dimethyldithiocarbamate; organobromine-based preservatives such as 2,2-dibromo-3-nitrilopropionamide, 2-bromo-2-nitro-1,3-propanediol, 2,2-dibromo-2-nitroethanol and 1,2-dibromo-2,4-dicyanobutane; as well as methyl p-hydroxybenzoate, ethyl p-hydroxybenzoate, potassium sorbate, sodium dehydroacetate and salicylic acid.

A printed item according to the present invention is an item printed using the inkjet ink described above. The inkjet printer used for performing the printing may employ any of various printing systems, including a thermal system, a piezo system or an electrostatic system or the like. The printer discharges the inkjet ink of the present invention from the inkjet nozzles based on a digital signal, and adheres the discharged ink droplets to a recording medium such as a sheet of paper. A printed item obtained in this manner suffers minimal paper deformation and also exhibits favorable print quality due to the favorable pigment dispersibility.

EXAMPLES

A more detailed description of the present invention is provided below based on a series of examples, although the present invention is in no way limited by these examples.

Examples and Comparative Examples (Synthesis of Py-g-PEG)

4-pyridylmethyl methacrylate (m=3), α-methyl-ω-methacryloyl-PEG (n=43), and an amount of AIBN (azobisisobutyronitrile) equivalent to 1 mol % of the 4-pyridylmethyl methacrylate were dissolved in an amount of DMF (dimethylformamide) equal to 10 times the mass of the monomers. The mixture was subjected to three repetitions of freezing and degassing, and the solution was then stirred for 24 hours at 60° C. The reaction mixture was then added dropwise to 2-propanol, and the resulting mixture was stirred for several minutes. The generated precipitate was isolated by centrifugal separation and then separated from benzene by freeze drying, yielding a white powder of Py-g-PEG (3). The number average molecular weight of the obtained Py-g-PEG was 32,920.

(Ink Preparation)

Using the formulations shown in Table 1, the components were mixed together to obtain a total mass of 30 g, 100 g of zirconia beads were added, and the mixture was dispersed for 120 minutes in a rocking mill (manufactured by Seiwa Giken Co., Ltd.), thus completing preparation of inks of examples 1 and 2, and comparative examples 1 to 4. The components used are listed below.

Pigment: MA600 (a carbon black, solid fraction: 100% by mass, manufactured by Mitsubishi Chemical Corporation)

Py-g-PEG (the copolymer synthesized above)

Solsperse 20000 (solid fraction: 100% by mass, manufactured by The Lubrizol Corporation)

Solsperse 27000 (solid fraction: 100% by mass, manufactured by The Lubrizol Corporation)

Demol NL (sodium salt of naphthalenesulfonic acid-formalin condensate, solid fraction: 40% by mass, manufactured by Kao Corporation)

Disperbyk-190 (solid fraction: 40% by mass, manufactured by BYK-Chemie GmbH)

Butysenol 40 (tetraethylene glycol monobutyl ether, manufactured by Kyowa Hakko Chemical Co., Ltd.)

Because the Demol NL and Disperbyk-190 used as dispersants in comparative examples 3 and 4 had a solid fraction of 40% by mass, the solid fraction within the dispersant was calculated as the effective amount of dispersant added, and the water within the dispersant was calculated as part of the water of the solvent medium.

(Evaluations)

Next, each of the inks of the examples and comparative examples was evaluated for dispersibility. The results of the evaluations are shown in Table 1.

Each of the inks prepared in the examples and comparative examples was inspected at a magnification of 100× using an optical microscope (BX51, manufactured by Olympus Corporation), and was evaluated against the following criteria.

O: no black aggregation of particles (the pigment) was observed, and the initial dispersibility was good.

x: black aggregation of particles (the pigment) was observed, and the initial dispersibility was poor.

TABLE 1

|  | Mass % | Example 1 | Example 2 | Comparative example 1 | Comparative example 2 | Comparative example 3 | Comparative example 4 |
|---|---|---|---|---|---|---|---|
| Pigment | MA600 | 2.0 | 2.0 | 2.0 | 2.0 | 2.0 | 2.0 |
| Dispersant (solid fraction) | Py-g-PEG | 2.0 | 2.0 | — | — | — | — |
|  | Solsperse 20000 | — | — | 2.0 | — | — | — |
|  | Solsperse 27000 | — | — | — | 2.0 | — | — |
|  | Demol NL | — | — | — | — | 2.0 | — |
|  | Disperbyk-190 | — | — | — | — | — | 2.0 |
| Solvent medium | Butysenol 40 | 76.8 | 48.0 | 76.8 | 76.8 | 76.8 | 76.8 |
|  | Ion-exchanged water | 19.2 | 48.0 | 19.2 | 19.2 | 19.2 | 19.2 |
|  | Butysenol 40/Ion-exchanged water | 8/2 | 5/5 | 8/2 | 8/2 | 8/2 | 8/2 |
|  | Total | 100.0 | 100.0 | 100.0 | 100.0 | 100.0 | 100.0 |
| Evaluation | Dispersibility | ○ | ○ | X | X | X | X |

As shown in Table 1, examples 1 and 2 used the Py-g-PEG dispersant of the present invention, and it is evident that, compared with comparative examples 1 to 4, aggregation of the pigment did not occur, and the dispersibility was favorable.

It is to be noted that, besides those already mentioned above, many modifications and variations of the above embodiments may be made without departing from the novel and advantageous features of the present invention. Accordingly, all such modifications and variations are intended to be included within the scope of the appended claims.

The invention claimed is:

1. An inkjet ink comprising at least a pigment, water, a water-soluble organic solvent having an α value of not more than 65, and a dispersant, wherein
    the dispersant is a copolymer having a unit A represented by general formula (a) shown below and a unit B represented by general formula (b) shown below, and
    a mass ratio between the water-soluble organic solvent and the water satisfies (water-soluble organic solvent)/water =5/5 to 8/2,

[Formula 1]

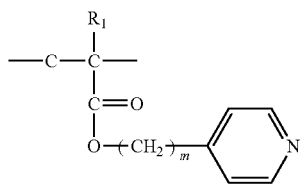
(a)

wherein $R_1$ represents a hydrogen atom or a lower alkyl group, and m represents an integer of 1 to 3,

[Formula 2]

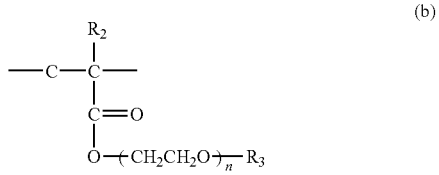
(b)

wherein $R_2$ and $R_3$ each represents a hydrogen atom or a lower alkyl group, $R_2$ and $R_3$ may be the same or different, and n represents an integer of 1 to 250.

2. The inkjet ink according to claim 1, wherein the water-soluble organic solvent comprises at least one of tetraethylene glycol monobutyl ether and triethylene glycol monobutyl ether.

3. A printed item printed using the inkjet ink according to claim 1.

* * * * *